(12) United States Patent
Hoffmann

(10) Patent No.: US 11,655,797 B2
(45) Date of Patent: May 23, 2023

(54) WIND TURBINE WITH TRAILING EDGE FLAP

(71) Applicant: Wobben Properties GmbH, Aurich (DE)

(72) Inventor: Alexander Hoffmann, Emden (DE)

(73) Assignee: Wobben Properties GmbH, Aurich (DE)

(*) Notice: Subject to any disclaimer, the term of this patent is extended or adjusted under 35 U.S.C. 154(b) by 151 days.

(21) Appl. No.: 16/960,467

(22) PCT Filed: Jan. 10, 2019

(86) PCT No.: PCT/EP2019/050572
§ 371 (c)(1),
(2) Date: Jul. 7, 2020

(87) PCT Pub. No.: WO2019/138008
PCT Pub. Date: Jul. 18, 2019

(65) Prior Publication Data
US 2020/0340444 A1 Oct. 29, 2020

(30) Foreign Application Priority Data
Jan. 10, 2018 (DE) ............. 10 2018 100 397.8

(51) Int. Cl.
*F03D 1/06* (2006.01)
*F03D 7/02* (2006.01)

(52) U.S. Cl.
CPC ......... *F03D 1/0633* (2013.01); *F03D 1/0675* (2013.01); *F03D 7/0232* (2013.01); *F05B 2240/221* (2013.01); *F05B 2240/301* (2013.01); *F05B 2240/311* (2013.01); *F05B 2270/327* (2013.01); *F05B 2270/402* (2013.01); *F05B 2280/4003* (2013.01)

(58) Field of Classification Search
CPC ..................................................... F03D 7/0232
See application file for complete search history.

(56) References Cited

U.S. PATENT DOCUMENTS 4,500,257 A * 2/1985 Sullivan .................... F03D 7/06
416/169 R
4,565,929 A 1/1986 Baskin et al.
(Continued)

FOREIGN PATENT DOCUMENTS

CN 103089540 B 5/2017
DE 2908761 A1 9/1980
(Continued)

*Primary Examiner* — Kayla Mccaffrey
(74) *Attorney, Agent, or Firm* — Seed Intellectual Property Law Group LLP

(57) ABSTRACT

A rotor blade for a wind turbine having an aerodynamic profile which extends from a blade root up to a blade tip and has a leading edge and a trailing edge. An adjustable aerodynamic flap, which can be adjusted between a retracted and a deployed position by means of a flap drive, is provided on the rotor blade. The flap drive comprises a passive control system which controls a flap position depending on rotation speed. The passive control system of the flap drive is low-maintenance and does not interfere with the safety concept of a wind turbine. In comparison with a reference rotor blade without a flap, the rotor blade has increased lift at low wind speeds.

21 Claims, 8 Drawing Sheets

(56) References Cited

U.S. PATENT DOCUMENTS

| | | | |
|---|---|---|---|
| 5,456,579 A | 10/1995 | Olson | |
| 5,570,859 A * | 11/1996 | Quandt | F03D 7/0252 244/113 |
| 7,828,523 B2 * | 11/2010 | Bonnet | F03D 1/0633 416/37 |
| 8,491,262 B2 | 7/2013 | McGrath et al. | |
| 8,506,248 B2 * | 8/2013 | Wilson | F03D 1/0641 416/41 |
| 9,932,965 B2 * | 4/2018 | Rath | F03D 7/06 |
| 2010/0310372 A1 | 12/2010 | Narasimalu | |
| 2012/0070283 A1 * | 3/2012 | Westergaard | F03D 1/065 416/23 |
| 2012/0269632 A1 * | 10/2012 | Westergaard | F03D 1/0641 416/159 |
| 2014/0356181 A1 * | 12/2014 | Mailly | F03D 7/0232 416/229 A |

FOREIGN PATENT DOCUMENTS

| | | |
|---|---|---|
| DE | 10155014 A1 | 5/2003 |
| DE | 10348060 A1 | 5/2005 |
| DE | 102012109171 A1 | 4/2013 |
| DE | 102015017127 A1 | 12/2016 |
| EP | 2634419 A1 | 9/2013 |
| FR | 2863320 A1 | 6/2005 |

* cited by examiner

WIND TURBINE WITH TRAILING EDGE FLAP

BACKGROUND

Technical Field

The present invention concerns a rotor blade with an aerodynamic flap, and a rotor with such a rotor blade, and a wind turbine with a rotor according to the invention. The invention furthermore concerns an assembly comprising an aerodynamic trailing edge flap and associated flap drive.

Description of the Related Art

The aerodynamic flap is, in particular, an edge flap, which influences the air flow at the trailing edge of the rotor blade. It is therefore referred to below as a trailing edge flap. In the design of rotor blades for wind turbines, amongst other factors, a compromise must be found between the maximum possible lift of the rotor blade, its drag, and the stability of the rotor blade. This is because a rotor blade profile which produces a high lift at low wind speeds usually has a high drag at higher wind speeds. Also, as well as the aerodynamic properties of the rotor blade, a designer must also ensure that the rotor blade can withstand a wind pressure which occurs for example in a storm. This requirement is easier to fulfil with thick rotor blades than with slender ones, because a thick profile allows a predefined stability to be achieved using less material than a slender profile. However, slender profiles are normally far more aerodynamically efficient than thick profiles. Another aspect is the curvature of a profile. At low attack speeds, a profile with a high convexity creates more lift than a profile with lower convexity. The attack speed is a vectorial addition of the wind speed and the circumferential speed with which a specific point on the rotor blade moves through the air flow. A high lift is desirable at low wind speeds because normally, the energy yield of a wind turbine is higher, the greater the lift of the rotor blade. However, a profile with high convexity has a greater drag at high attack speeds than a rotor blade with a lower convexity. Over a longer period and at particular sites, a stronger profile curvature could even have a negative effect on the energy yield of a wind turbine. For these reasons, a rotor blade is optimized for the respective application, taking into account the above-mentioned design parameters.

With the aim of increasing the yield of wind turbines in the partial load range, trailing edge flaps are already used in which the deflection is controlled by assigned measurement sensors and by the turbine plant control system. The trailing edge flaps are extended towards the pressure side of the rotor blade at low wind speeds and retracted again as the wind speed rises. These trailing edge flaps ensure that, firstly, more lift is achieved at low wind speeds in comparison with a reference profile without trailing edge flap, but the drag at higher wind speeds is no greater than in a reference profile.

In the technical implementation of a trailing edge flap, the deflection of which is actively controlled by the turbine plant control system using corresponding measurement sensors, difficulties arise in relation to the lightning conduction capacity or a corresponding surge voltage protection of the electrical systems necessary for controlling the trailing edge flap. In addition, such an active control system of a trailing edge flap is also complicated because it interferes with the safety system or safety concept of a wind turbine. Because of the high safety relevance of such an active flap control system, the flap adjustment device and the associated sensors entail a high maintenance complexity.

Rotor blades with trailing edge flaps and similar technical solutions are known for example from US 2014/0356181 A1, DE 103 48 060 A1, DE 10 2015 017 127 A1, DE 10 2012 109 171 A1, DE 101 55 014 A1, DE 29 08 761 A1, EP 2 634 419 A1 and FR 2 863 320 A1.

BRIEF SUMMARY

Proposed is a rotor blade for a wind turbine having an aerodynamic profile which extends from a blade root up to a blade tip and has a leading edge and a trailing edge. An adjustable aerodynamic flap is arranged on the rotor blade, and can be adjusted between a retracted and a deployed position by means of a flap drive. The flap drive comprises a passive control system which controls a flap position depending on rotation speed. The passive control of the flap drive is low maintenance and does not interfere in the safety concept of a wind turbine.

Although here the example of a flap in the form of an attachment has been selected, the teaching is not restricted thereto and all aerodynamic attachments may advantageously be regulated or controlled with the passive control system.

It is particularly advantageous if the flap drive is made from an electrically non-conductive material, in particular plastic.

In one exemplary embodiment, the flap drive has, as a drive source to generate force, a centrifugal body and an elastic element which provides an elastic force that exceeds the centrifugal force generated by the centrifugal body up to a predetermined rotation speed of the rotor on which the rotor blade is arranged. The combination of the centrifugal body with the elastic element ensures a purely passive control of the flap. The predetermined rotation speed may be set by the design of the elastic element and for example may also amount to zero revolutions.

Suitably, the flap drive comprises a gear mechanism in order to convert the centrifugal force, directed radially outwardly from the centrifugal body, into a pivot or rotational movement of the flap.

In particular when faults occur, it has proved advantageous if the rotor blade has a locking mechanism which is able to lock the adjustable flap. Preferably, the flap can be locked in the retracted position. If a malfunction of the aerodynamic flap is found during operation, by means of the locking mechanism it is possible for a service engineer to lock the flap as an immediate solution, so that the rotor blade behaves as a conventional rotor blade without aerodynamic flap. Suitably, such a locking mechanism is provided on each rotor blade of a wind turbine so that the aerodynamic flaps can be locked on all rotor blades, whereby the same aerodynamic properties can be achieved for all rotor blades. In this way, the wind turbine can continue operating safely until repair, for example as part of a more extensive maintenance of the wind turbine.

It has proved particularly advantageous to form the aerodynamic flap as a trailing edge flap.

Advantageously, the aerodynamic flap can be adjusted from its starting position only towards the pressure side of the aerodynamic profile, preferably in an angular range of 0-15°. Extending the flap to the pressure side causes an increase in the curvature of the aerodynamic profile, whereby the lift generated by the rotor blade is increased.

In other embodiments, alternatively or additionally, the flap may also be adjustable in the direction of the suction side.

The aerodynamic flap may be produced in various designs. For example, the flap may be produced as a split flap, a camber flap, a slotted flap, a Fowler flap and a through-flow flap. The present invention allows the most suitable flap type for a specific application to be used.

In particular applications, it has proved suitable if several flaps are provided on the rotor blade, preferably three to five aerodynamic flaps, which can be adjusted independently of each other. Because of the larger number of flaps, greater flexibility can be achieved with respect to the aerodynamic properties of the rotor blade.

Particularly preferably, the flaps are connected together or to the rest of the rotor blade trailing edge elastically, so that no air gaps occur when the respective flap is deployed.

It may be advantageous if different flap types are arranged on the rotor blade simultaneously.

Advantageously, the aerodynamic flap is arranged in a region of the rotor blade where the thickness of the rotor blade is between 50% and 19% of the maximum profile thickness.

In practice, it has proved suitable if the length of the aerodynamic flap in the direction of a rotor blade longitudinal axis is between 0.5 and 5 m.

A particularly favorable effect of the aerodynamic flap is achieved if the flap is arranged in a region close to the hub, which extends from a blade root up to half the total length of the rotor blade. Because of the arrangement in particular in the inner third of the blade, and because of a relatively small flap deflection angle, the flaps are not sound-critical. In other words, no additional operating restrictions due to sound emission levels result from the use of the flaps.

Advantageously, the depth of the aerodynamic flap is approximately between 5 and 25% of the profile depth of the aerodynamic profile of the rotor blade in the region in which the aerodynamic flap is arranged.

In one embodiment of the invention, a flap angle between the retracted and the maximally deployed flap position is no more than 20°. At larger flap angles, the drag of the rotor blade increases disadvantageously greatly.

In a further exemplary embodiment, a flap angle, in the inner region of the rotor blade close to the hub, between the retracted and the maximally deployed flap position is up to 90°. In this case, the flap acts as a type of Gurney flap.

Advantageously, the rotor blade drive also comprises a damping element. The damping element prevents rapidly changing and/or periodic forces which act on the flap from leading to oscillations or resonances of the flap.

It has proved suitable if the mass of the centrifugal body is between 1 kg and 25 kg. The amount of mass depends on the radial distance of the centrifugal body from the rotational center.

According to a second aspect, provided is an assembly comprising an aerodynamic trailing edge flap and a flap drive, and is configured for mounting on a trailing edge of a rotor blade of a wind turbine. The assembly can be exchanged comparatively easily and quickly if a fault occurs on the flap drive or on the flap itself during operation of the wind turbine.

Particularly advantageously, all parts of the assembly are made from an electrically non-conductive material, in particular plastic. The absence of metallic parts is extremely important for rotor blades, in order not to attract lightning during storms.

According to a third aspect, provided is a rotor with one or more rotor blades according to the first aspect of the invention.

Finally, the provided is a wind turbine which is equipped with a rotor according to the invention.

BRIEF DESCRIPTION OF THE SEVERAL VIEWS OF THE DRAWINGS

The present invention is explained in more detail below as an example using exemplary embodiments with reference to the accompanying figures. The figures are diagrammatic and not to scale. In the figures, the same or equivalent components carry the same or corresponding reference signs. The drawings show schematically as examples.

DETAILED DESCRIPTION

Figure 1:
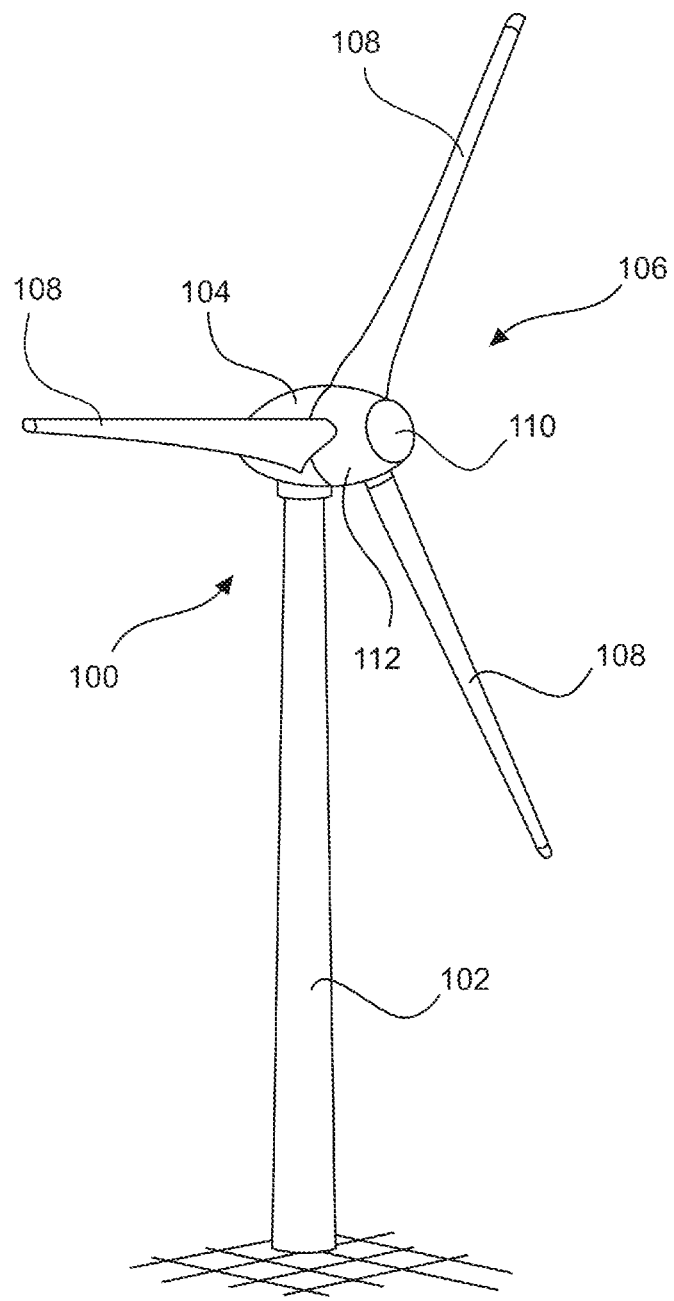
FIG. 1 a diagrammatic view of a wind turbine.

FIG. 1 shows a wind turbine 100 with a tower 102 and a nacelle 104. A rotor 106 with three rotor blades 108 and a spinner 110 is arranged on the nacelle 104. During operation, the rotor 106 is set in a rotational movement by the wind and thereby drives a generator in the nacelle 104. The rotor blades 108 are each arranged with their blade root on a hub 112 so as to be twistable about the longitudinal axis, in order to achieve a rotor blade adjustment. A pitch control system of the wind turbine 100 controls the rotor blade setting such that the rotor blades can extract as much energy as possible from the wind at low wind speeds, up to a wind speed at which the wind turbine achieves its nominal power (nominal wind speed). At wind speeds above the nominal wind speed, as the wind speeds rise further, the rotor blades are increasingly turned out of the wind, i.e., the pitch angle of the rotor blades is increased in order to keep the wind turbine at the nominal power and nominal rotation speed. In a preferred exemplary embodiment, the rotor blades are adjusted individually by the rotor blade adjustment system.

In principle however, it is also possible that the same pitch angle is always set for all three rotor blades 108.

In the interest of maximum yield from the wind turbine, it is desirable if the wind turbine reaches its nominal power as quickly as possible. To this end trailing edge flaps are provided on the rotor blades, which increase the lift of the rotor blades at low wind speeds.

The structure of a rotor blade 108 is firstly explained below, and then its aerodynamic function is presented.

Figure 2:
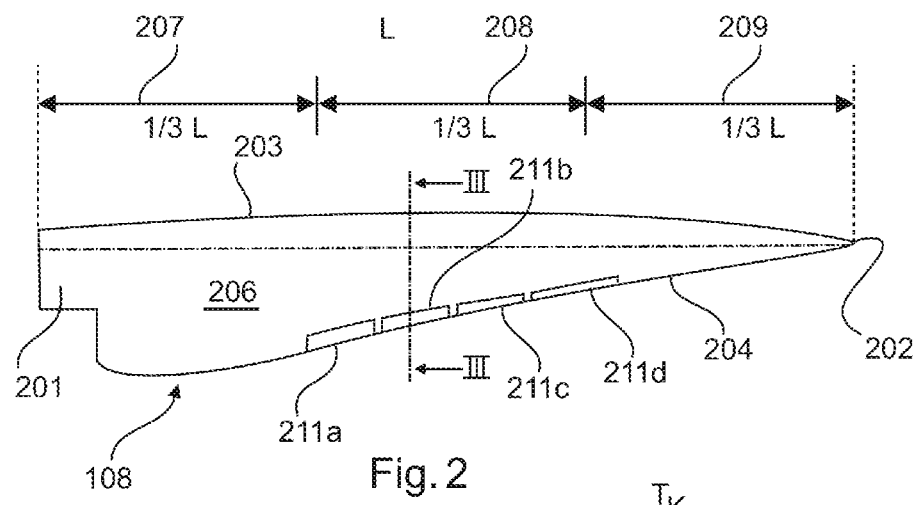
FIG. 2 a rotor blade of the wind turbine from FIG. 1 in top view.

FIG. 2 shows a diagrammatic depiction of a top view of a single rotor blade 108. The rotor blade 108 extends from a blade root or hub connecting region 201, where the rotor blade 108 is connected to the hub 112, up to a blade tip 202. The rotor blade 104 has a leading edge 203 and a trailing edge 204 to form an aerodynamic profile. However, in the hub connecting region 201, the rotor blade 108 usually has a round cross-section because here the emphasis is more on stability than on aerodynamic effect. FIG. 2 shows a top view of the suction side 206 of the rotor blade 108, the overall length of which is marked L. The rotor blade 108 can be divided roughly into an inner region 207 close to the hub, a middle region 208, and an outer region 209. The latter ends at the blade tip 202.

In the exemplary embodiment shown in FIG. 2, four trailing edge flaps 211a-211d are arranged on the trailing edge 204 of the rotor blade 108. As evident from the depiction in FIG. 2, the profile depth $T_K$ (FIG. 3) of the trailing edge flaps diminishes from the blade root 201 to the blade tip 202. In other words, for the profile depths of the trailing edge flaps 211a-211d, $T_K(211a) \geq T_K(211b) \geq T_K(211c) \geq T_K(211d)$, wherein the profile depth $T_K(211a)$ relates to the trailing edge flap 211a, etc. The profile depth of the flaps 211a-211d is approximately between 5% and 25% of the profile depth of the aerodynamic profile of the rotor blade in the region in which the flaps are arranged. The length of the flap in the direction of the rotor blade longitudinal axis, in this exemplary embodiment, is around 4 m. In other exemplary embodiments, the flap length may be between 0.5 and 5 m. Each of the aerodynamic flaps 211a-211d is arranged on the rotor blade in a region in which the thickness of the rotor blade is between 50% and 19% of the maximum profile thickness. In other exemplary embodiments, fewer or more than four flaps may be provided. A rotor blade longitudinal axis 212 is marked by a dotted line. The extent of the flaps should be understood as exemplary. All flaps may have a constant extent in the chord direction which is independent of the local profile depth of the rotor blade.

The terms "trailing edge flap" and "flap" in the present description are used synonymously since only trailing edge flaps are used. It is however also conceivable to transfer the teaching of the invention to flaps on the leading edge or other aerodynamic attachments.

For the sake of brevity, reference is made below to only a single flap 211 as an example of all flaps when several flaps are present in an exemplary embodiment. With reference to the exemplary embodiment shown in FIG. 2, the flap 211 thus means one of the flaps 211a-211d. This simplification does not however exclude that, in the presence of several flaps on a rotor blade, each flap is deployed at a different flap angle. In principle, it is also possible that one or more corresponding flaps on different rotor blades are deflected with mutually different flap angles, wherein in practice the deviations may be slight.

Figure 3:
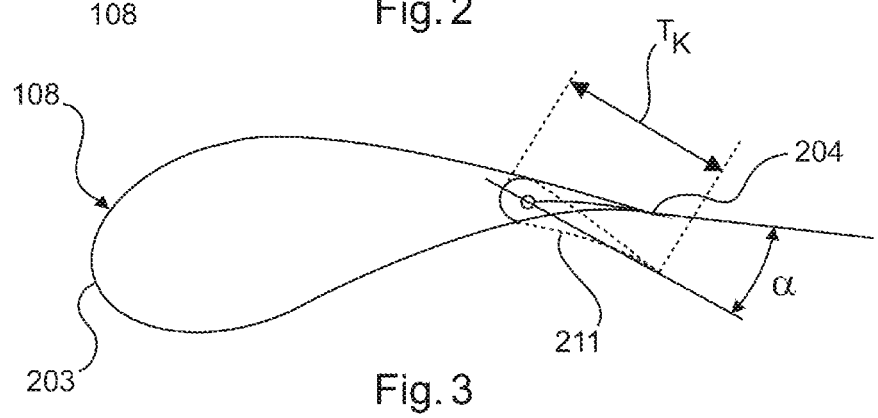
FIG. 3 a cross-section through the rotor blade from FIG. 2.

FIG. 3 shows a cross-section through the rotor blade 108 along line from FIG. 2. In FIG. 3, the rotor blade with a retracted flap 211 (flap 211b in FIG. 2) is depicted as a solid line. With a fully retracted flap 211, the profile of the rotor blade 108 is identical to the profile of a rotor blade without trailing edge flap. A rotor blade without trailing edge flap is designated below as a reference profile. The fully deployed flap 211 is marked with dotted lines. A flap angle α indicates by how much the deployed flap has pivoted in comparison with the fully retracted flap position. The convention is selected such that α=0° corresponds to a fully retracted flap. In the exemplary embodiment shown in FIG. 3, the flap 211 can be pivoted by a maximum angle of α=20° to the pressure side of the rotor blade. A negative flap angle α accordingly indicates that the flap 211 is pivoted towards a suction side of the rotor blade.

In an exemplary embodiment (not shown in the drawing), the flap angle α, in particular in the inner region 207 close to the hub, may be up to 90°. The flap then acts as a Gurney flap which allows a significant reduction in profile depth.

Pivoting the flap 211 towards the pressure side of the rotor blade increases the curvature of the aerodynamic profile of the rotor blade 108, which—as described initially—leads to a greater lift at wind speeds below the nominal wind speed of a wind turbine. In other words, at a constant rotor rotation speed and for constant wind conditions, the coefficient of lift of a rotor blade profile depends on the profile curvature of the rotor blade. The greater the curve of the rotor blade, the greater the coefficient of lift, which in turn means that the rotor can supply a greater torque to the generator and hence the yield of the wind turbine increases.

In other exemplary embodiments, the maximum flap angle α is selected smaller, for example α=5°. In general, the flap angle α is adapted to the respective profile of the rotor blade 108, which in turn is adapted to the area of application of the wind turbine. In concrete terms, this means that for sites with low winds, usually a different profile is selected for the rotor blades than for sites with high winds.

As evident from FIG. 3, the flap 211 is a camber flap. The invention is however independent of the type of flap used, so the camber flap 211 shown is presented merely as an example. In other embodiments of the invention, the flap is configured for example as a split flap, a slotted flap, a Fowler flap and a through-flow flap.

Figure 4:
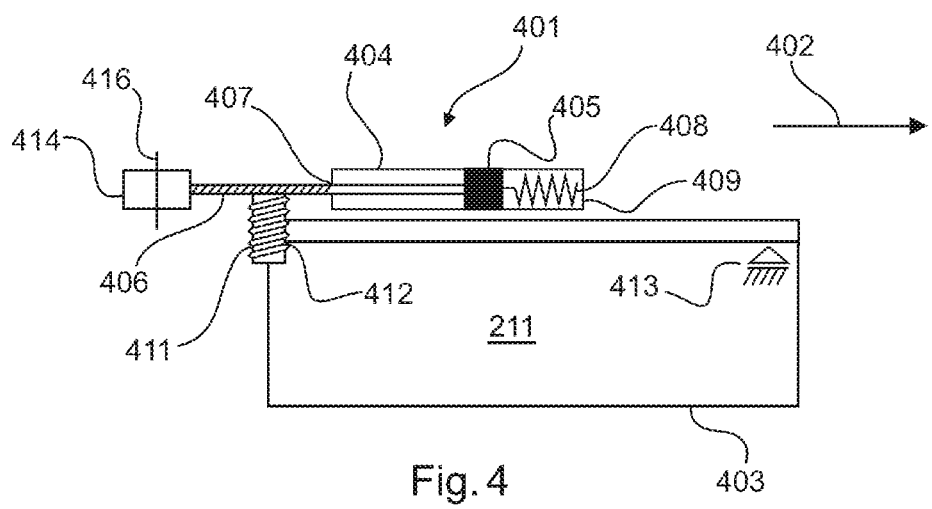
FIG. 4 a diagrammatic depiction of a flap drive.

FIG. 4 shows a diagrammatic depiction of a drive 401 for passive control of the flap 211. The installation position of the drive 401 is such that the arrow 402 points towards the rotor blade tip 202, and in the retracted state of the flap 211, the flap edge 403 forms the trailing edge 204 of the rotor blade 108. A centrifugal body 405 is arranged in a guide tube 404 closed at one end, such that said body is movable in the longitudinal direction of the guide tube. Depending on exemplary embodiment, the centrifugal body 405 has a mass of between 1 kg and 25 kg, which depends amongst other factors on the geometry, material density and radial position of the centrifugal body 405 on the rotor blade. The guide tube 404 is arranged substantially parallel to the longitudinal axis of the rotor blade 108 which extends from the blade root 201 to the blade tip 202. On the side facing the blade root 201, the centrifugal body 405 is fixedly connected to a twisted rod 406 which protrudes through an open end 407 of the guide tube 404. A compression spring 408, which on one side rests on the centrifugal body 405 and on its other side on a closed end 409 of the guide tube 404, is arranged in the guide tube 404 on the side of the centrifugal body 405 facing the blade tip 202. The twisted rod 406 meshes with a pinion 411. In the region of the pinion 411, the flap 211a is mounted in a fixed bearing 412, and on the opposite side of the flap 211a has a movable bearing 413 on the rotor blade 108.

In the interests of optimum lightning protection, all components of the flap and the drive 401 are made of electrically non-conductive material, in particular plastic. Fiber-reinforced plastics, in particular glass-fiber-reinforced plastics, are suitable here.

The twisted rod 406 meshes with the pinion 411 such that the reciprocating movement of the twisted rod 406 causes a pivot movement of the pinion 411 and hence of the flap 211a.

If the rotor of the wind turbine is not turning, the spring force of the compression spring 408 is so great that the flap 211 assumes a fully deployed position, i.e., the flap angle α is at a maximum. In the depiction shown in FIG. 4, the fully deployed flap 211 is shown pivoted downward in the drawing plane. When the rotor of the wind turbine is set in rotation, a centrifugal force acts on the centrifugal body 405 in the direction of arrow 402 in accordance with the formula $$F_z = m\omega^2 r,$$

wherein m is the mass of the centrifugal body, w the angular speed, and r the distance of the centrifugal body from the rotational center of the rotor.

The spring force of the compression spring 408 is selected such that the centrifugal force generated by the centrifugal body 405 only overcomes the spring force after a limit rotation speed $n_{gr}$ of approximately 4 revolutions per minute (rpm) has been exceeded. As a result, the flap 211 gradually moves from the deployed position to the retracted position. The compression spring 408 is thereby compressed, which leads to a rise in spring force until equilibrium is restored between the spring force and the centrifugal force. In this way, a passive control of the flap position as a function of the rotation speed is achieved without using sensors or actuators. At the latest when the wind turbine reaches the nominal rotation speed, the flap 211 is completely retracted.

In other exemplary embodiments, the compression spring 408 is replaced for example by gas spring. In principle, for the implementation of the invention, it is irrelevant which means are used to generate a counter-force which is oriented against the centrifugal force generated by the centrifugal body 405.

The gravity acting on the flap 211 during the revolution of the rotor leads to fluctuations in the forces exerted on the flap 211. In order to prevent oscillation or resonance effects, in one exemplary embodiment of the invention, a damping element 414 is also provided. The damping element 414 is mechanically coupled to the twisted rod 406 and acts in the manner of a shock absorber in a vehicle. On a rapid movement of the twisted rod 406, the damping element 414 exerts a large counter-force, whereas on slow movements a substantially lower counter-force acts against this. In this way, rapidly changing aerodynamic forces caused by turbulence, and a revolutionarily periodic change in the gravity acting on the flap, do not lead to an adjustment of the flap 211. As a result, at any rotation speed $n > n_{gr}$, a stable flap angle is set between α=0° and the maximum flap angle.

In addition, the damping element 414 is provided with a locking mechanism 416 which allows locking of the twisted rod 406. Depending on the configuration of the locking mechanism 416, this may take place at one or more predefined positions and at arbitrary positions. Preferably, the twisted rod 406 can be locked at a position which corresponds to a fully retracted flap. In this way, it is possible to safely continue operation of the wind turbine, even on a fault in flap drive 401, until a repair is possible.

In a concrete exemplary embodiment, the flap angle is α=0° when the wind turbine reaches its nominal rotation speed. The flap angle α remains at α=0° even at rotation speeds above the nominal rotation speed. Only when the rotation speed of the rotor again falls below the limit nominal rotation speed is the flap 211a gradually extended again and the flap angle α assumes values of α>0°.

The drive 401 is described as passive because there are no sensors of any type with correspondingly assigned actuators to cause deflection of the flap 211. Rather, the deflection of the flap 211 is controlled exclusively by the interaction of the centrifugal body 405 and the spring 408.

The drive 401 and the flap 211 are formed as an assembly which can be mounted as a unit in a rotor blade 108. If a fault occurs on the trailing edge flap 211 or the drive 401, it is possible to carry out a repair by simple replacement of the assembly. In particular, this avoids the need to remove a rotor blade from the rotor 106 for repair.

Figure 5A:
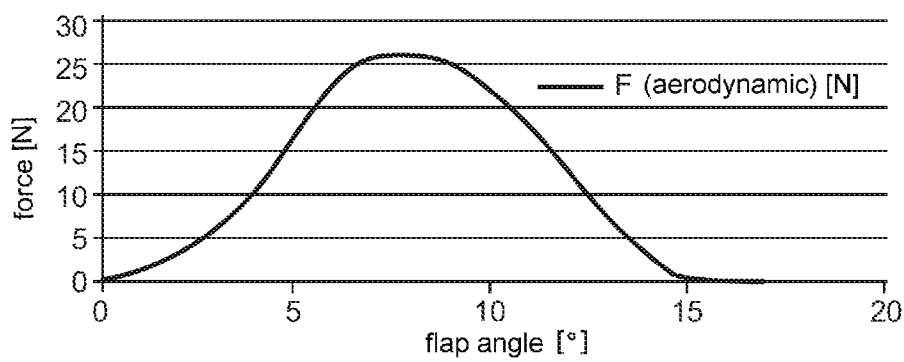
FIG. 5A an aerodynamic force acting on a trailing edge flap.

As well as centrifugal force, aerodynamic forces act on the flap 211; these depend on the size of the flap angle α. FIG. 5A shows the curve of the aerodynamic force which is exerted on the flap 211 at a specific wind speed and specific angle of attack, as a function of the flap angle α. In the example shown, the maximum flap angle is α=15°. As evident from FIG. 5A, the aerodynamic force disappears when the flap 211 is fully retracted and fully deployed. In between, the aerodynamic force approximately follows a bell curve, the maximum of which lies at around α=8°. The aerodynamic force is directed such that it drives the flap 211 in the direction of the retracted state. This additional aerodynamic force must be taken into account in the design of the drive 401.

Figure 5B:
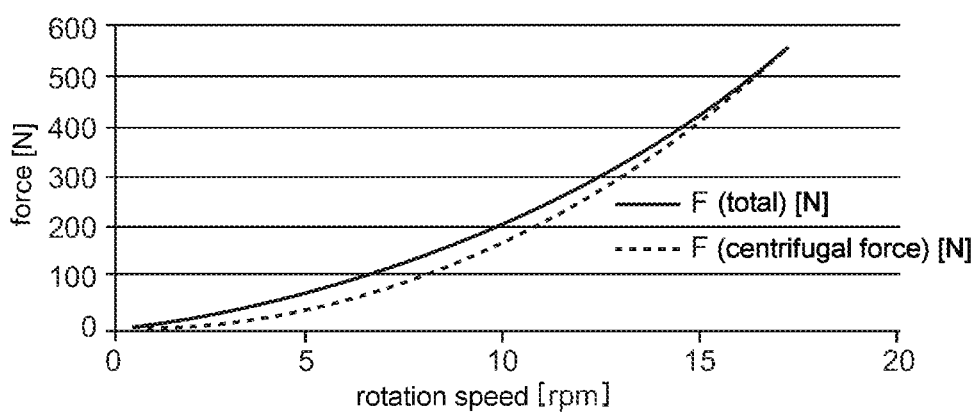
FIG. 5B a total force acting on a trailing edge flap.

FIG. 5B shows as a solid line the total force composed of the aerodynamic force generated by the flap 211 and the centrifugal force generated by the centrifugal body 405, as a function of the rotation speed of the rotor. The centrifugal force generated by the centrifugal body 405 is shown as a dotted line. The total force is increased in comparison with the purely centrifugal force in a rotation speed range between approximately 4 rpm to 14 rpm, which is attributable to the aerodynamic force generated by the flap. At rotation speeds below approximately 4 rpm, the total force is approximately equal to the centrifugal force because the aerodynamic force disappears when the flap 211 is fully deployed. In the exemplary embodiment considered, with the flap fully deployed, the flap angle is α=15°. At a flap angle of α=15°, the aerodynamic force disappears, as shown in FIG. 5A. The same applies to rotation speeds above approximately 14 rpm, at which the flap is fully retracted and accordingly no aerodynamic force is generated by the flap, as also evident from FIG. 5A. Therefore at low and at high rotation speeds, the total force corresponds to the centrifugal force.

The drive of the trailing edge flap shown in FIG. 4 is merely an exemplary embodiment. In fact, the present invention is independent of the specific fashion in which the centrifugal force generated by the centrifugal body 405 is transmitted to a trailing edge flap. For example, in another exemplary embodiment, a lever gear mechanism is provided or a cable drive, in particular using a pulley system. In principle, any type of gear mechanism may be used which is suitable for translating the longitudinal motion of the centrifugal body 405 into a pivot motion for the flap.

The general effect of a trailing edge flap (as described initially) on a rotor blade is now explained in more detail with reference to characteristic curves of the turbine plant.

Figure 6:
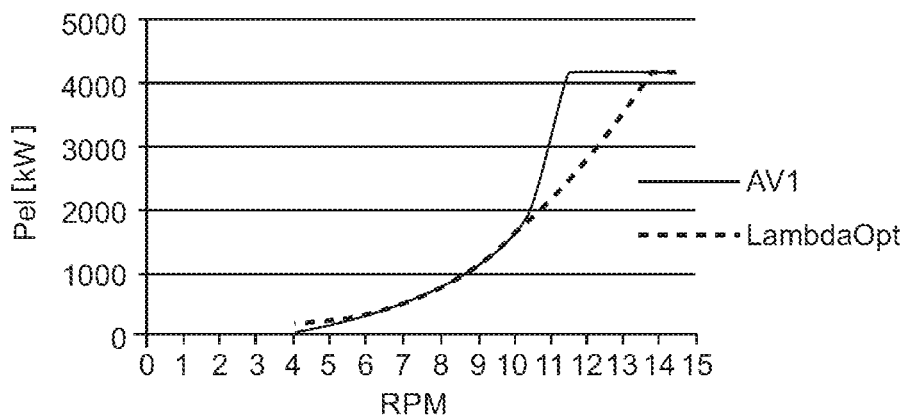
FIG. 6 power curves of a wind turbine.

FIG. 6 shows two operating curves for a wind turbine. At the first operating curve marked "LambdaOpt" (optimum tip speed ratio k), which is shown as a dotted line, the rotor rotation speed of the wind turbine is controlled such that the rotor rotates as far as possible with the optimum tip speed ratio λ. The tip speed ratio indicates the ratio of the blade tip speed to the wind speed. The second operating curve marked "AV1," shown as a solid line, indicates a practical example in which the tip speed ratio deviates from the optimum above a rotor rotation speed of 10 rpm. It is clear from FIG. 6 that with the operating curve "AV1," the nominal power of the wind turbine is already achieved at approximately 11 rpm, while according to the operating curve "LambdaOpt," the nominal power is only achieved at around 13 rpm.

The deviation from the optimum tip speed ratio has an influence on the induction factors of the rotor blade. Ideally, a rotor blade is designed such that the induction factors, which describe the deceleration of the air flow in the rotor plane, are approximately ⅓. If the induction factors fall below this value, the power coefficients of the wind turbine also fall. The power coefficient describes the ratio between the energy produced by the wind turbine relative to the primary energy contained in the wind. The theoretical maximum value for the power coefficient cp is 0.59.

Figure 7A:
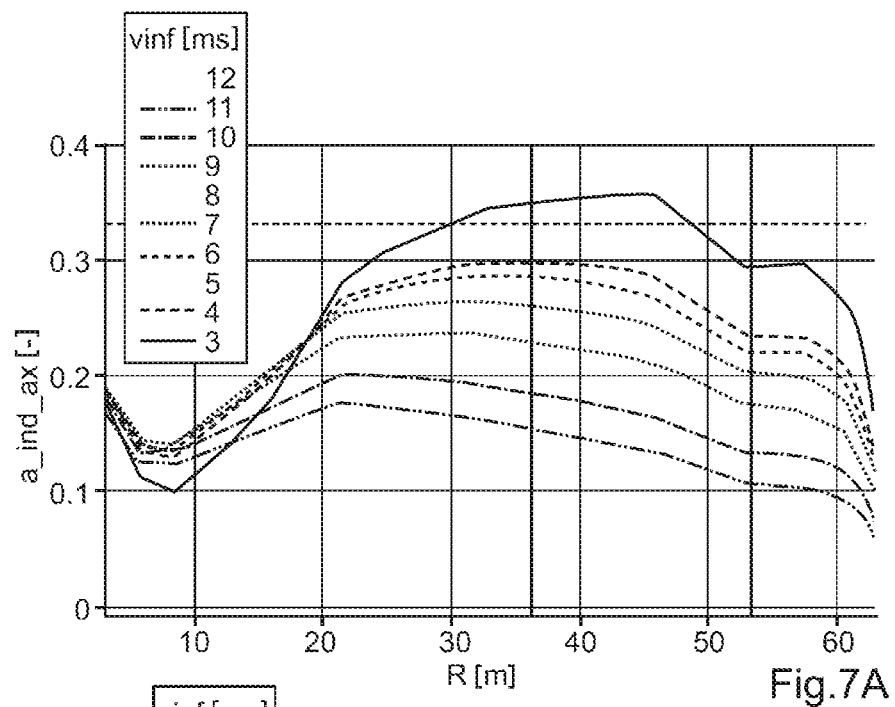
FIG. 7A induction factors of a rotor blade without trailing edge flap at different wind speeds.

FIG. 7A shows the induction factors for a rotor blade with a length of 63 m. The induction factors are shown on the y axis as a function of the distance from the rotational center of the rotor. The distance from the rotational center of the rotor is shown on the x axis, wherein x=0 corresponds to the position of the rotational center of the rotor, while the rotor blade tip is on the far right in the diagram. This diagram shows the induction factors for different wind speeds in several curves. It is clearly evident that the induction factors deviate significantly from the optimal value of ⅓ from wind speeds above 5 m/s. It must be taken into account here that above wind speeds of around 11 m/s, the rotor blade is in any case turned out of the wind because the wind turbine has already reached its nominal power. At high wind speeds therefore, falling induction factors are of no further significance, because they do not normally influence the energy yield of the wind turbine. Conversely, at low to moderate wind speeds, induction factors which lie close to the optimum are favorable because they have a directly positive effect on the energy yield.

Figure 7B:
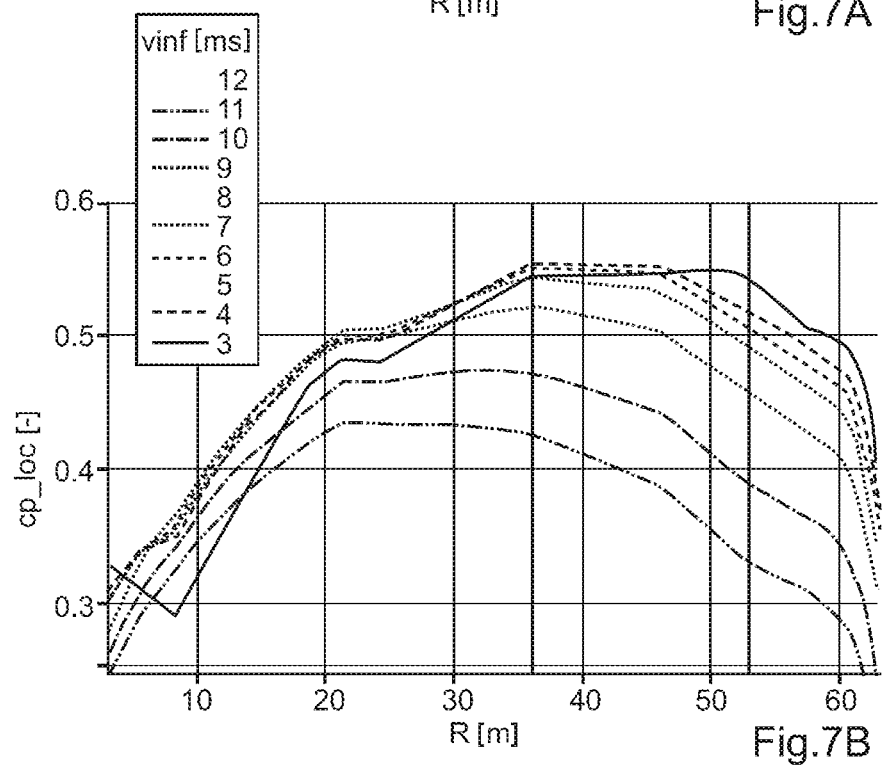
FIG. 7B power coefficients of a rotor blade without trailing edge flap at different wind speeds.

This correlation is shown in FIG. 7B, which depicts the power coefficients corresponding to the induction factors of the same rotor blade. The power coefficients decrease in synchrony with the induction factors at moderate wind speeds of 6-9 m/s, in particular in a region of the rotor blade at a distance of 36-53 m from the rotational center of the rotor. The fall in the power coefficients at high wind speeds of 10-12 m/s is again without practical significance, because at these wind speeds the wind turbine has already reached its nominal power, so lower power coefficients have no influence on the energy yield of the wind turbine.

The fall in induction factors or power coefficients is at least partially compensated by the use of a trailing edge flap. For illustration, an exemplary embodiment is considered in which a trailing edge flap is arranged on the rotor blade in a region between 36 m and 53 m away from the hub, and deflected for example by 20° towards the pressure side.

Figure 8A:
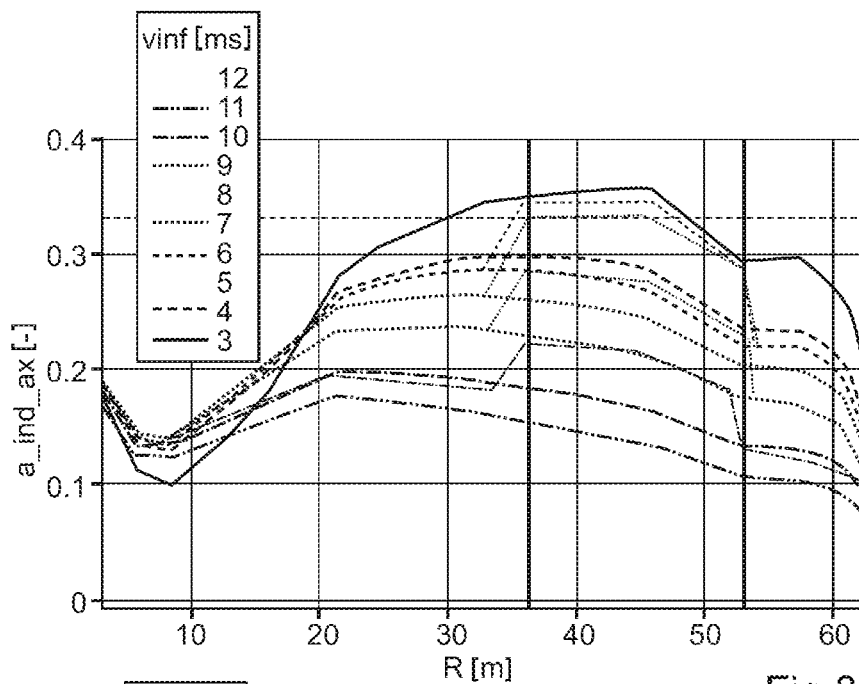
FIG. 8A induction factors of a rotor blade with trailing edge flap at different wind speeds.

FIG. 8A, which fully corresponds to FIG. 7A, shows the induction factors as a function of the distance from the center of rotation of a rotor which is equipped with rotor blades with trailing edge flaps. The trailing edge flaps are arranged on the rotor blades at a distance between 36 m and 53 m from the rotational center of the rotor. The induction factors are shown as separate curves in the diagram for different wind strengths. For moderate wind strengths in the range from 6 to 9 m/s, the induction factors in the region of the rotor blade 108 between 36 m and 53 m, where the trailing edge flaps are active, are significantly higher than for a reference profile without trailing edge flap.

Figure 8B:
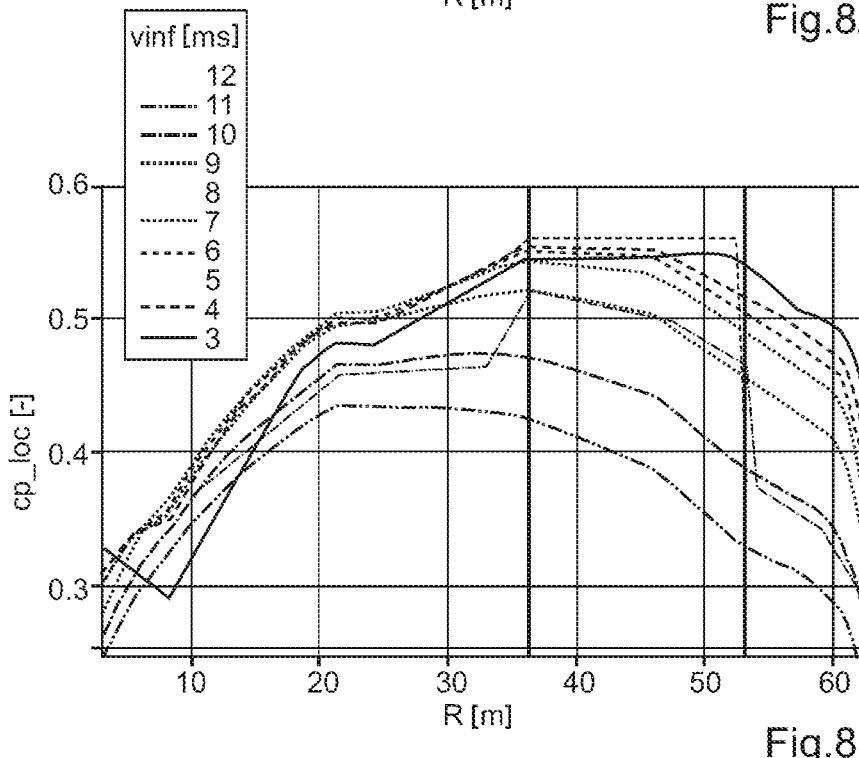
FIG. 8B power coefficients of a rotor blade with trailing edge flap at different wind speeds.

FIG. 8B shows the power coefficients cp corresponding to the induction factors shown in FIG. 8A, which are also increased in comparison with a reference profile without trailing edge flap because of the increase in induction factors. This applies in particular for the region from 36 to 53 m where the trailing edge flaps are active.

Figure 9:
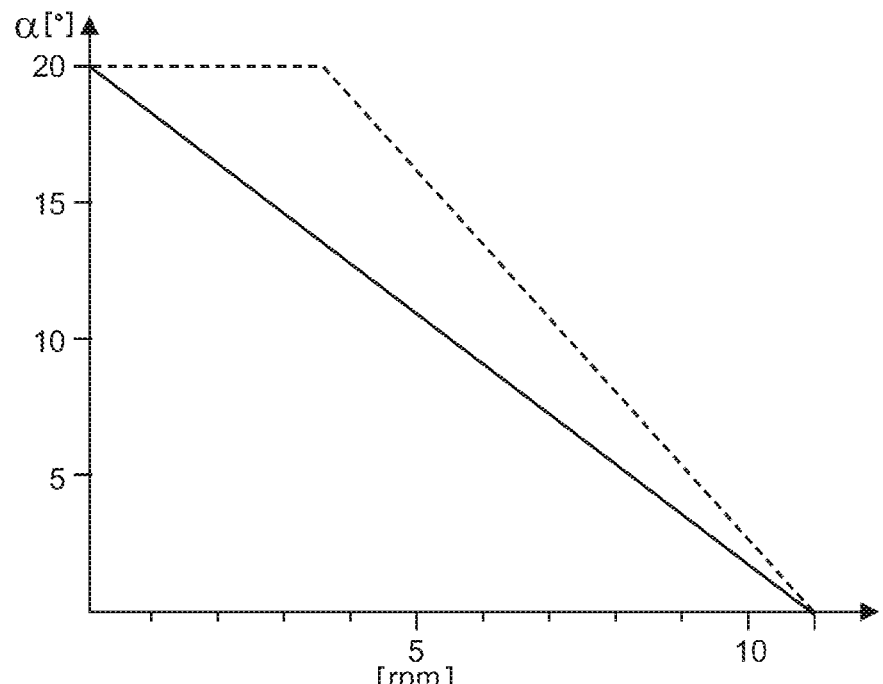
FIG. 9 a flap angle as a function of rotor rotation speed.

FIG. 9 shows as a solid line a curve of the flap angle α as a function of the rotor rotation speed. Starting from a flap angle of α=20° for a stationary rotor, the flap angle is continuously adjusted to a value of α=0° at 11 rpm. The value of α=20° here indicates a trailing edge flap which is deployed to a maximum towards the pressure side of the rotor blade, while α=0° corresponds to a fully retracted trailing edge flap. Between the minimum and maximum values, the flap angle α changes linearly as a function of rotation speed. This curve is shown merely as an example, and in other exemplary embodiments it may be provided that the trailing edge flap remains fully deployed up to a limit rotation speed, and is only retracted at rotation speeds above this limit speed. In FIG. 9, as a second example, this case is depicted as a dotted line, wherein in this case the limit rotation speed is 4 rpm. In other exemplary embodiments, the limit rotation speed may be less than or more than 4 rpm.

Figure 10:
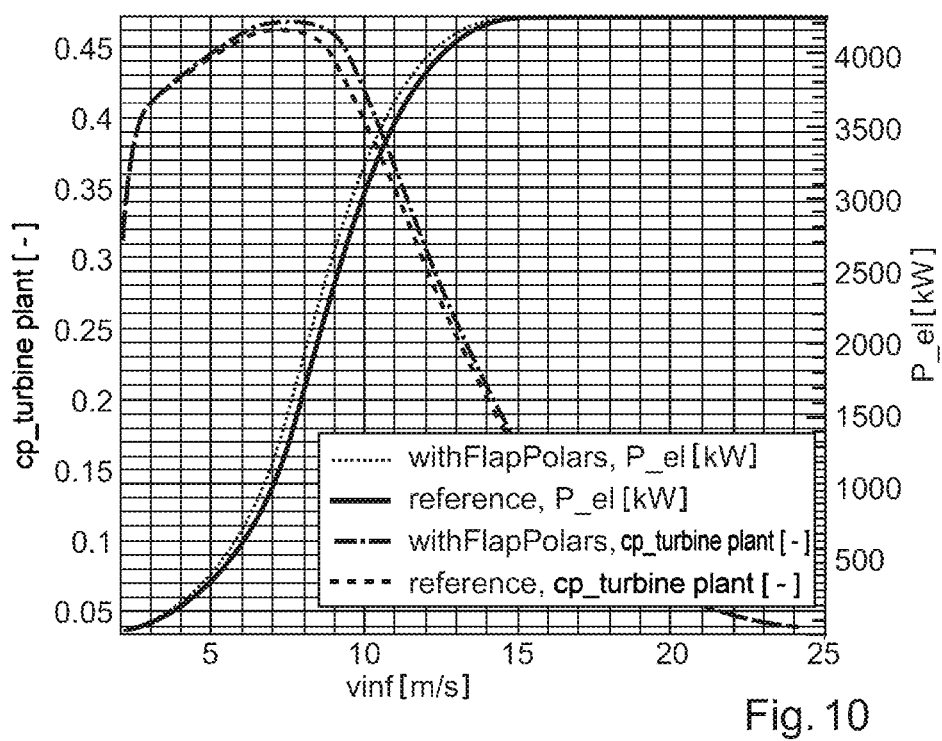
FIG. 10 power coefficient and power curves for rotor blades with and without trailing edge flap.

FIG. 10 shows a curve of the power coefficients of a rotor blade without trailing edge flap (reference profile) in comparison with a rotor blade with trailing edge flap, as a function of wind speed. The power coefficients are shown on the left ordinate, and the wind speed on the abscissa. In the comparison, it is clear that the power coefficient of the rotor blade with trailing edge flaps is higher than the power coefficient of a rotor blade without trailing edge flaps in the wind speed range between 7 and 13 m/s. The same applies to the electrical power curve which is shown on the right ordinate in the diagram. A wind turbine with rotor blades equipped with trailing edge flaps achieves a higher power at said moderate wind speeds between 7 and 13 m/s.

Table 1 shows a differential value for the annual energy yield, for a series of mean wind speeds, between a wind turbine with rotor blades equipped with trailing edge flaps (AEP(flap)) and a wind turbine without trailing edge flaps (AEP(ref)). The differential value for the annual energy yield ΔAEP (annual energy production) is calculated as follows:

$$\Delta AEP = \frac{AEP(\text{flap}) - AEP(ref)}{AEP(ref)}$$

This gives the following values:

TABLE 1

| mean wind speed (m/s) | ΔAEP (%) |
|---|---|
| 5.5 | 1.64 |
| 6.6 | 1.68 |
| 7.5 | 1.57 |
| 8.5 | 1.41 |

In a concrete exemplary embodiment, the annual energy yield of a wind turbine with rotor blades equipped with a trailing edge flap is approximately 1-2% higher than a wind turbine with reference profile without trailing edge flap.

Figure 11:
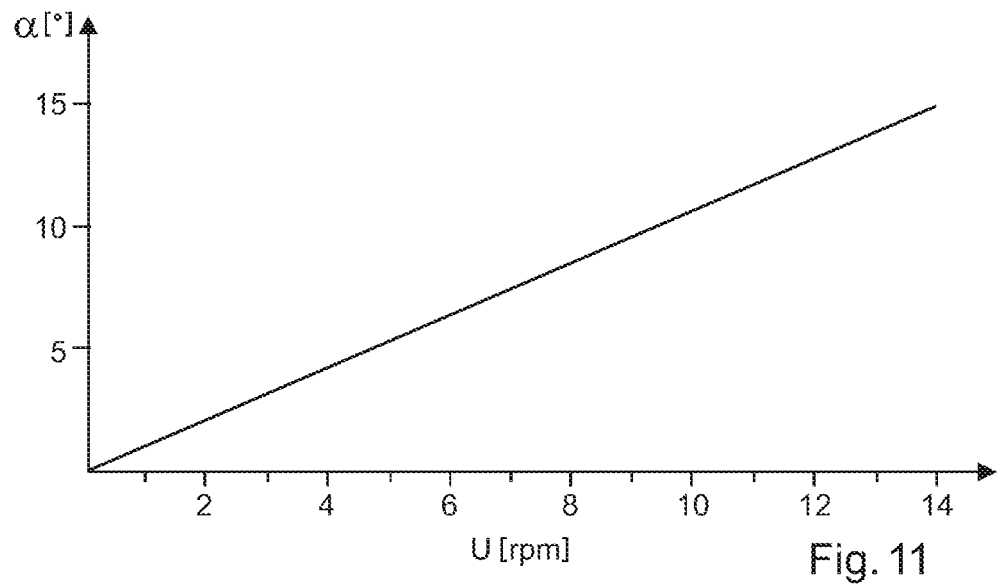
FIG. 11 a flap angle as a function of rotor rotation speed.

In an alternative exemplary embodiment of the invention, the trailing edge flap is set precisely inversely to the exemplary embodiments described, wherein the trailing edge flap is fully retracted at low rotation speeds and deployed as the rotation speed rises. This behavior of the trailing edge flap is illustrated by the diagram in FIG. 11. FIG. 11 shows that the flap angle increases as a function of rotation speed. In a concrete exemplary embodiment, at 0 revolutions per minute the flap angle is $\alpha=0°$, while at 14 rpm it reaches a maximum value of $\alpha=15°$.

Although the influence of the trailing edge flap always depends on the overall profile of the rotor blade, in most cases the aerodynamic behavior deteriorates if the flap angle increases as a function of rotation speed. This behavior may however be useful, for example in a wind turbine for sites with low winds, for which the rotor blades are optimized for low wind speeds. In order to reduce the load on the rotor blades at high wind speeds, a trailing edge flap is extended in the direction of the suction side at high rotation speeds, which causes a deterioration in the aerodynamic properties of the rotor blades in order to reduce the load. The load on the rotor blades is here reduced independently of the set pitch angle. The rotor blades may therefore be designed for lower loads, which saves materials and costs.

Figure 12:
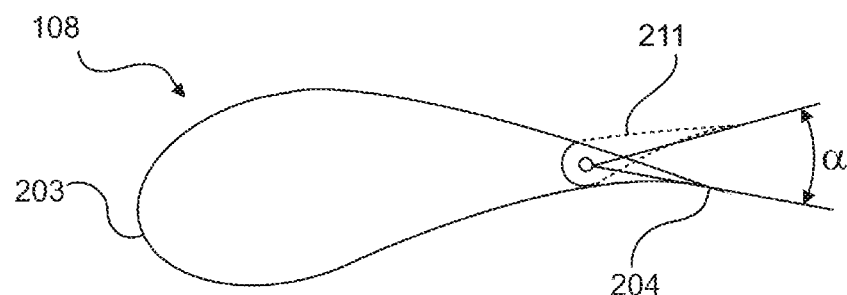
FIG. 12 a cross-section through a rotor blade with trailing edge flap.

The alternative exemplary embodiment of the invention is shown in FIG. 12. The flap 211 extended towards the suction side is shown in dotted lines. Following the selected convention, the flap angle in FIG. 12 is negative.

Figure 13:
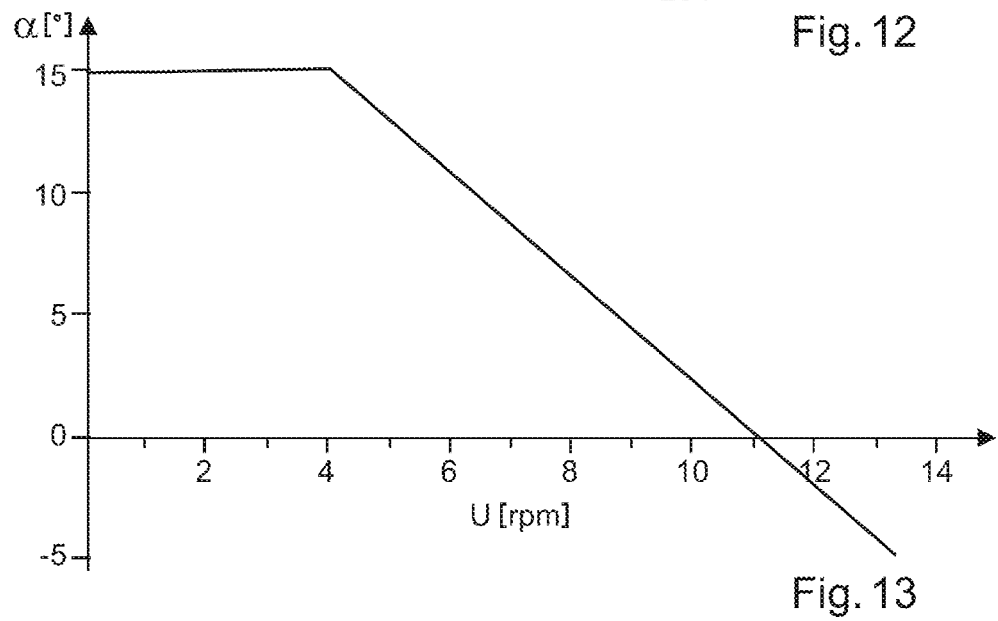
FIG. 13 a flap angle as a function of rotor rotation speed.

FIG. 13 shows the curve of the flap angle in this exemplary embodiment as a function of rotation speed. At low rotation speeds, the trailing edge flap is fully extended towards the pressure side of the rotor blade until a limit rotation speed is reached, for example 4 rpm. Thereafter, the flap angle diminishes continuously in order to reach the value of $\alpha=0°$ at a rotation speed of 11 rpm, corresponding to a fully retracted trailing edge flap. If the rotation speed rises above 11 rpm, the trailing edge flap is extended towards the suction side of the rotor blade, as shown in FIG. 12. The aerodynamic properties of the rotor blade thereby deteriorate, giving the desired load relief for the rotor blade.

In the alternative embodiments also, the adjustment of the rotor blade is achieved by a passive control system in which the force necessary to adjust the trailing edge flap is produced by a centrifugal body.

Figure 14:
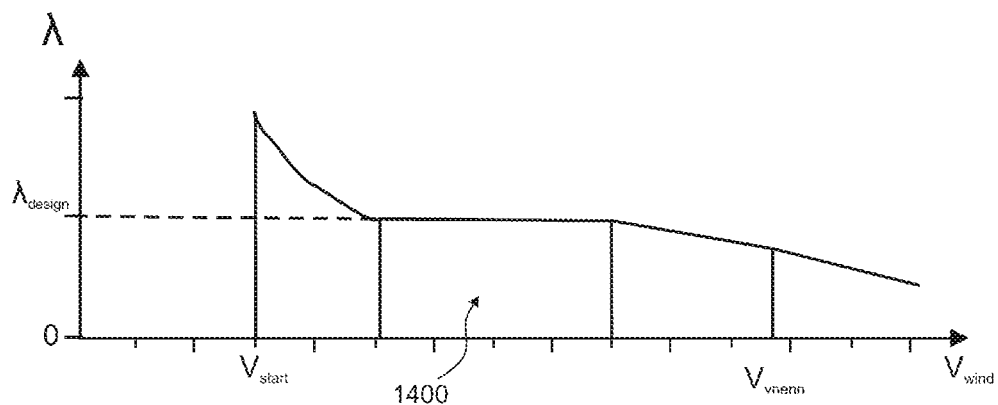
FIG. 14 a curve of tip speed ratio over wind speed.

FIG. 14 shows diagrammatically as an example a curve of the tip speed ratio $\lambda$ over the wind speed $v_{wind}$. The tip speed ratio $\lambda$ also influences the induction factor. The turbine is in operation above a starting wind speed $v_{Start}$. In a partial load range 1400, the turbine is rotated more quickly at higher wind speeds in order to hold the tip speed ratio $\lambda$ at the optimum value $\lambda_{Design}$. Shortly before the nominal power $P_{nenn}$ at nominal wind speed $v_{nenn}$, the turbine begins to deviate from the optimum tip speed ratio $\lambda_{Design}$, so the induction factor typically also falls in this region.

Figure 15:
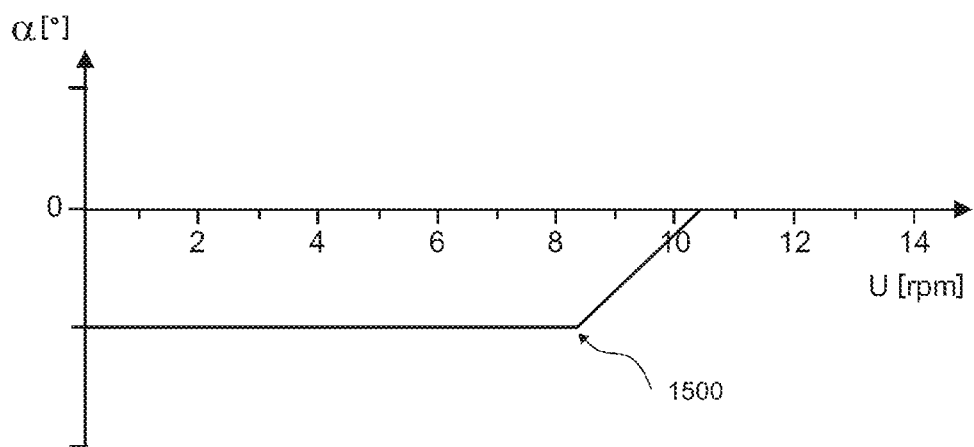
FIG. 15 a flap angle as a function of rotor rotation speed.

FIG. 15 shows diagrammatically as an example a curve of the flap angle over the rotor rotation speed, which addresses this fall in induction factor in the region of the nominal power. For turbines for high wind speeds, the induction factors in the partial load range are usually higher than the Betz optimum, so these are described as over-induced turbines. This is because the induction factor should be held at the optimum at higher wind speeds, since these wind speed ranges frequently occur in the case where turbines are designed as a high wind speed turbines.

Because, in the operating range just around nominal power (see FIG. 14), the turbine rotates more slowly relative to the wind speed than in the partial load range, the induction factor in said range is lower than in the partial load range 1400. Because the turbine is over-induced in the partial load range, it deviates (upward) from the optimum power coefficient there. This is also undesirable.

FIG. 15 shows diagrammatically as an example a control system of the flap angle, by means of which the lift can be reduced in the partial load range by extending the flaps in the direction of the suction side. Only above a threshold value 1500 for the rotor rotation speed are the flaps returned to the 0° position, so the original design lift is again generated in this operating range for power levels close to the nominal wind speed $V_{nenn}$.

Thus in this embodiment, it can be guaranteed that the local induction factor remains in the region of the Betz optimum over the entire operating range of the wind turbine, and thus the aerodynamic power of the rotor blade is improved by avoiding over-induction in the partial load range.

Figure 16:
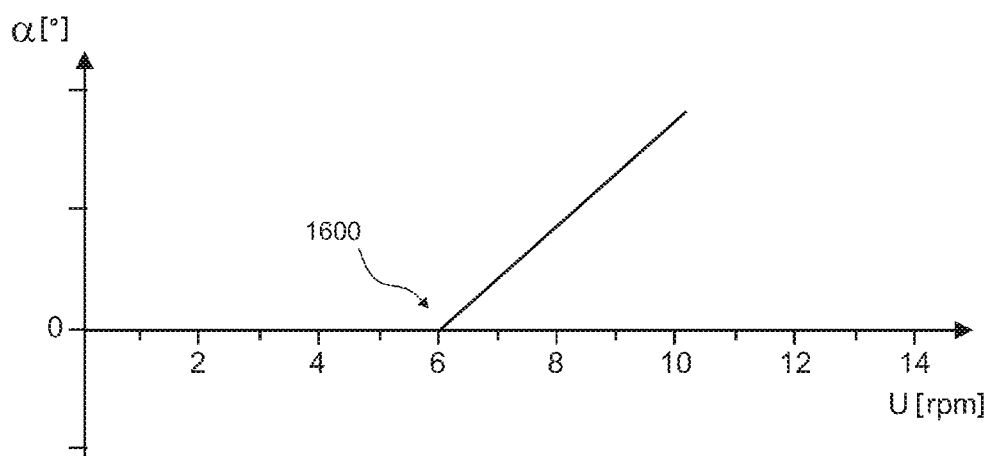
FIG. 16 a flap angle as a function of rotor rotation speed.

FIG. 16 shows diagrammatically as an example a further curve of the flap angle over the rotor rotation speed. This exemplary embodiment is particularly suitable for locations at which the loads are not critical, for example locations with reduced air density.

The tip speed ratio $\lambda$ begins to fall in the higher partial load range, i.e., in the operating range between the partial load range 1400 and nominal power, as described with reference to FIG. 14. In this case, the induction factor can again be increased by the trailing edge flaps, in that the flaps are turned in the positive direction above a rotor rotation speed 1600 and thereby generate additional lift.

This procedure however leads to increases in load. The increase in load is however smaller than caused by the usually completed or necessary reduction in blade angle, i.e., by pitching the rotor blades. If the trailing edge flaps are arranged in a specific region of the blade and thus only affect local induction factors, as a whole a lower load is achieved. Also, the risk of flow separation, as caused by a reduction in the blade setting or pitch angle, is reduced. In the diagrammatic FIG. 16, above the rotor rotation speed 1600, the flap angle is therefore increased as the rotor rotation speed rises.

LIST OF REFERENCE SIGNS

100 Wind turbine
102 Tower
104 Nacelle
106 Rotor
108 Rotor blades
110 Spinner
112 Hub
201 Blade root
202 Blade tip
203 Leading edge
204 Trailing edge
206 Suction side
207 Inner region
208 Middle region
209 Outer region
211a-211d Flaps
212 Rotor blade longitudinal axis
401 Drive for trailing edge flap
402 Arrow (towards blade tip)
403 Edge
404 Guide tube
405 Centrifugal body
406 Twisted rod
407 Open end 408 Compression spring
409 Closed end
411 Pinion
412 Fixed bearing
413 Movable bearing
414 Damping element
416 Locking mechanism
1400 Partial load range
1500 Threshold value
1600 Rotor rotation speed

The invention claimed is:

1. A rotor blade for a wind turbine, comprising:
a body having an aerodynamic profile extending from a blade root to a blade tip, and having a leading edge and a trailing edge,
at least one adjustable aerodynamic flap arranged on the body, and
a flap drive configured to adjust the at least one adjustable aerodynamic flap between a retracted position and a deployed position, wherein the flap drive comprises a passive control system configured to control a flap position depending on rotation speed,
wherein the flap drive has, as a drive source to generate force, a centrifugal body, and an elastic element providing an elastic force that exceeds a centrifugal force generated by the centrifugal body up to a predetermined rotation speed of a rotor on which the rotor blade is arranged, and wherein the flap drive is configured such that, when the rotor is not rotating, the flap is in a fully extended position, and only when a limit speed of the rotor is exceeded, the centrifugal force generated by the centrifugal body exceeds the elastic force of the elastic element such that the flap drive gradually adjusts the flap from the extended position into the retracted position.

2. The rotor blade as claimed in claim 1, wherein the flap drive is made from an electrically non-conductive plastic.

3. The rotor blade as claimed in claim 1, wherein the flap drive comprises a gear mechanism.

4. The rotor blade as claimed in claim 1, further comprising a locking mechanism configured to lock the at least one adjustable aerodynamic flap, wherein the at least one adjustable aerodynamic flap is configured to be locked in the retracted position.

5. The rotor blade as claimed in claim 1, wherein the at least one adjustable aerodynamic flap is formed as a trailing edge flap.

6. The rotor blade as claimed in claim 1, wherein the at least one adjustable aerodynamic flap is configured to be adjusted from a starting position towards a pressure side of the aerodynamic profile.

7. The rotor blade as claimed in claim 1, wherein the at least one adjustable aerodynamic flap is a flap comprising one of a split flap, a camber flap, a slotted flap, a Fowler flap, or a through-flow flap.

8. The rotor blade as claimed in claim 1, wherein the at least one adjustable aerodynamic flap is a plurality of adjustable aerodynamic flaps, wherein the plurality of adjustable aerodynamic flaps are configured to be adjusted independently of each other.

9. The rotor blade as claimed in claim 8, wherein the plurality of adjustable aerodynamic flaps include a plurality of different types of flaps.

10. The rotor blade as claimed in claim 1, wherein the at least one adjustable aerodynamic flap is arranged in a region of the body at a thickness of the body that is between 50% and 19% of a maximum profile thickness.

11. The rotor blade as claimed in claim 1, wherein a length of the at least one adjustable aerodynamic flap in a direction of a rotor blade longitudinal axis is between 0.5 and 5 meters.

12. The rotor blade as claimed in claim 1, wherein the at least one adjustable aerodynamic flap is arranged in a region that extends from the blade root up to one half a total longitudinal length of the body.

13. The rotor blade as claimed in claim 1, wherein a depth of the at least one adjustable aerodynamic flap is approximately between 5% and 25% of a profile depth of the aerodynamic profile of the rotor blade in a region in which the at least one adjustable aerodynamic flap is arranged.

14. The rotor blade as claimed in claim 1, wherein a flap angle between the retracted position and a maximally deployed flap position is no more than 20°.

15. The rotor blade as claimed in claim 1, wherein a flap angle, at an inner region of the rotor blade close to a hub, between the retracted position and a maximally deployed flap position is up to 90°.

16. The rotor blade as claimed in claim 1, wherein the flap drive comprises a damping element.

17. The rotor blade as claimed in claim 1, wherein a mass of a centrifugal body of the flap drive is between 1 kg and 25 kg.

18. A rotor comprising one or more rotor blades as claimed in claim 1, wherein the one or more rotor blades are coupled to the rotor.

19. An assembly comprising:
an aerodynamic trailing edge flap and a flap drive configured for mounting on a trailing edge of a rotor blade for a wind turbine,
wherein the flap drive has, as a drive source to generate force, a centrifugal body, and an elastic element providing an elastic force that exceeds a centrifugal force generated by the centrifugal body up to a predetermined rotation speed of a rotor on which the rotor blade is arranged, and wherein the flap drive is configured such that, when the rotor is not rotating, the flap is in a fully extended position, and only when a limit speed of the rotor is exceeded, the centrifugal force generated by the centrifugal body exceeds the elastic force of the elastic element such that the flap drive gradually adjusts the flap from the extended position into a retracted position.

20. The assembly as claimed in claim 19, wherein the assembly is made from an electrically non-conductive material.

21. A wind turbine comprising the rotor as claimed in claim 18.

* * * * *